United States Patent [19]

Nishimura et al.

[11] Patent Number: 5,532,784
[45] Date of Patent: Jul. 2, 1996

[54] EYE-GAZE DETECTING ADAPTER

[75] Inventors: Hitoshi Nishimura, Komae; Masao Owashi, Kawasaki, both of Japan

[73] Assignee: Nikon Corporation, Tokyo, Japan

[21] Appl. No.: 354,155

[22] Filed: Dec. 6, 1994

Related U.S. Application Data

[63] Continuation of Ser. No. 116,697, Sep. 7, 1993, abandoned.

[30] Foreign Application Priority Data

Sep. 14, 1992 [JP] Japan .................... 4-245199

[51] Int. Cl.⁶ .................... G03B 29/00; G03B 17/02; G03B 13/02; A61B 3/14
[52] U.S. Cl. .................... 354/410; 354/62; 354/288; 354/219; 351/210
[58] Field of Search .................... 354/62, 288, 219, 354/410; 351/206, 209, 210

[56] References Cited

U.S. PATENT DOCUMENTS

| | | | |
|---|---|---|---|
| 5,048,946 | 9/1991 | Sklar et al. | 351/206 |
| 5,155,516 | 10/1992 | Shindo | 354/219 |
| 5,182,443 | 1/1993 | Suda et al. | 354/62 X |
| 5,245,381 | 9/1993 | Takagi et al. | 354/219 X |
| 5,260,734 | 11/1993 | Nishimura | 354/219 |

FOREIGN PATENT DOCUMENTS

| | | |
|---|---|---|
| 2-65836 | 3/1990 | Japan . |
| 3-109028 | 5/1991 | Japan . |

Primary Examiner—Russell E. Adams
Attorney, Agent, or Firm—Shapiro and Shapiro

[57] ABSTRACT

An eye-gaze detecting apparatus is constructed as an independent adapter component, which is detachably mounted onto a camera body and which has information reflecting individual differences among observers for proper eye-gaze detection. An eye-gaze detecting adapter has an illuminating device for illuminating an eyeball of observer, an illumination drive device for driving the illumination device, an observing device for observing the eyeball of observer illuminated by the illuminating device, an observation drive device for driving the observing device, a ROM having information necessary for eye-gaze detection, a CPU for calculating an eye-gaze direction of observer with reference to the information from ROM, and a communication device for transmitting the information of eye-gaze direction obtained by the CPU to a camera body.

23 Claims, 12 Drawing Sheets

1

EYE-GAZE DETECTING ADAPTER

This is a continuation of application Ser. No. 08/116,697 filed Sep. 7, 1993, now abandoned.

BACKGROUND OF THE INVENTION

1. Field of the Invention

The present invention relates to an adapter having an eye-gaze detecting apparatus for detecting the eye-gaze direction of observer looking into camera, and to a camera on which the adapter having an eye-gaze detecting apparatus can be mounted.

2. Related Background Art

There have been proposed various methods for detecting the eye-gaze direction of observer and various cameras carrying therein the eye-gaze detecting apparatus for detecting the eye-gaze direction, for example as described in Japanese Laid-open Patent Application No. 2-65836.

Either of the conventional eye-gaze detecting apparatus is, however, built in a finder portion of camera body, so that the accuracy of eye-gaze detection is uniquely determined by the eye-gaze detecting apparatus built in camera body, which is insufficient to deal with individual differences among observers looking into camera.

SUMMARY OF THE INVENTION

It is, therefore, an object of the present invention to make an adapter component of eye-gaze detecting apparatus independent of a camera body as detachably mountable thereon, whereby the adaptor component may carry out appropriate eye-gaze detection with stored information reflecting individual differences among observers.

An eye-gaze detecting adapter of the present invention comprises illuminating means for illuminating an eyeball of observer, illumination drive means for driving the illuminating means, observing means for observing the eyeball of observer illuminated by the illuminating means, observation drive means for driving the observing means, a read only memory having information necessary for eye-gaze detection, a calculating device for calculating an eye-gaze direction of observer with reference to the information from the read only memory, and communication means for transmitting the information of eye-gaze direction obtained by the calculating device to a camera body.

In the present invention, independent eye-gaze detecting adapters are interchanged so that the individual differences among observers looking into camera may be fully dealt with, whereby accurate eye-gaze detection can be made.

DESCRIPTION OF THE PREFERRED EMBODIMENTS

The embodiments of the present invention will be described in detail with reference to the accompanying drawings.

Figure 1:
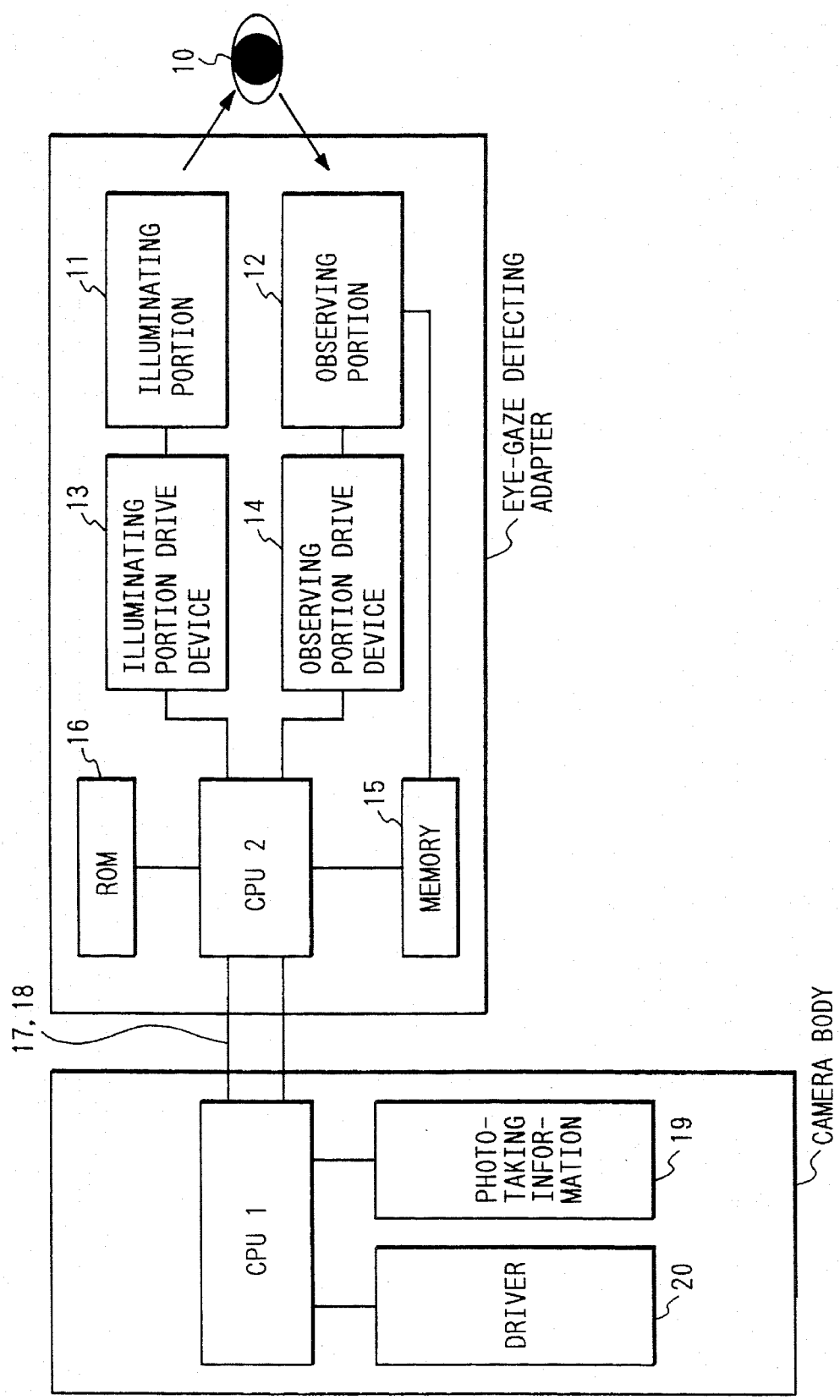
FIG. 1 is a block diagram to show function assignments for eye-gaze detecting adapter and for camera body in the first embodiment.

FIG. 1 is a block diagram to show function assignments for eye-gaze detecting adapter and for camera body in the first embodiment. In FIG. 1, an eye-gaze detecting adapter has an illuminating portion 11 for illuminating an eyeball 10 of observer, an observing portion 12 for observing the eyeball 10 of observer illuminated by the illuminating portion 11, a memory 15 which is a storage portion for storing information output from the observing portion 12, a ROM 16 having information necessary for eye-gaze detection (for example, constants of eyes, such as the distance between eyeball center and cornea center, and the distance between eyeball center and pupil center; constants of eye-gaze detecting adapter, such as the eye point of finder, the imaging magnification on CCD, and the deviation between visual axis and optical axis of eye optical system), a CPU 2 for calculating an eye-gaze direction from information in memory 15 and information from ROM 16, an illuminating portion drive device 13 and an observing portion drive device 14 controlled by the CPU 2, and a communication portion 17 for transmitting the information of eye-gaze direction to a CPU 1 in camera body through contacts provided in a finder portion of camera body. The contents stored in ROM 16 should be changed depending upon the eye-gaze detection method employed. The eye-gaze detection method is disclosed for example in Japanese Laid-open Patent Application No. 2-65836, and therefore is omitted to explain herein.

The camera body has a communication portion 18 provided in the finder portion, for receiving the information of eye-gaze direction from the eye-gaze detecting adapter. The eye-gaze direction received from the eye-gaze detecting adapter is used for control of camera. The CPU 1 processes the information of eye-gaze direction thus received, information from camera body (such as phototaking mode, ISO information, and exposure information) and phototaking information 19 obtained from phototaking lens, and has a function to control a driver 20 for driving various functions in camera. There are various drivers proposed for driving the functions in camera, based on the information of eye-gaze direction, the information from camera body and the phototaking information obtained from phototaking lens, and therefore the details thereof are omitted herein.

The CPU 1 is arranged to exchange only a timing for detecting the eye-gaze direction and the information of obtained eye-gaze direction with the eye-gaze detecting adapter. In the first embodiment the eye-gaze is detected on the eye-gaze detecting adapter side, different from in the second and third embodiments as will be described hereinafter. Therefore, the eye-gaze direction can be detected without increasing the load on CPU 1, even if an eye-gaze detecting adapter, which detects the eye-gaze direction by an eye-gaze detecting method (for example, a method for calculating an eye-gaze direction by obtaining a first Purkinje image and the pupil center), is replaced by another adapter using another eye-gaze detecting method (for example, a method for calculating an eye-gaze direction by obtaining a first Purkinje image and a fourth Purkinje image). This is because the CPU 1 receives only the eye-gaze direction information calculated by the CPU 2.

Figure 2A:
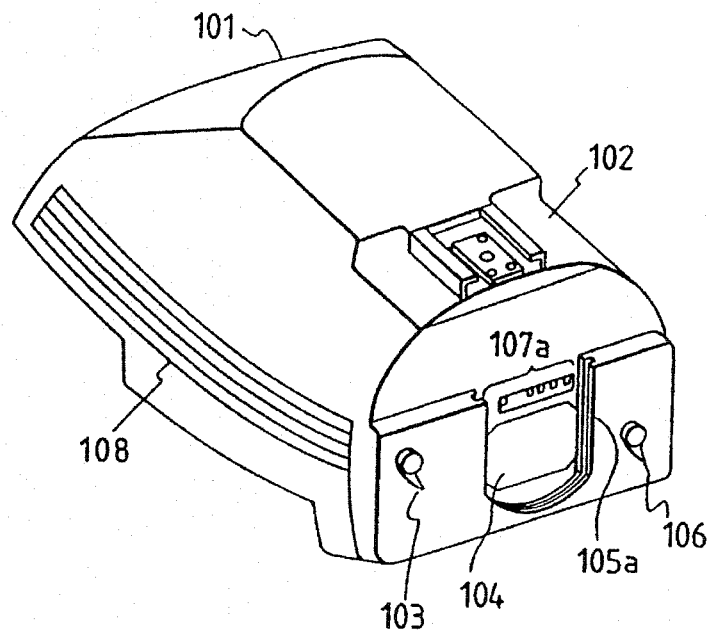
FIGS. 2A and 2B are drawings to show a finder portion of camera body and an eye-gaze detecting adapter, respectively, in the first embodiment.
Figure 2B:
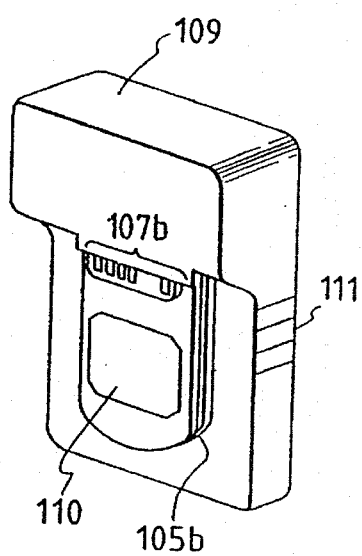

FIG. 2A and FIG. 2B are drawings to show the specific construction of the first embodiment.

FIG. 2A shows a finder portion of camera body. There are known a type of finder integral with camera body and a type of finder detachable from camera body, depending upon the type of camera. The finder portion 101 may be either one of the two finder types in the present invention. An auxiliary flash light apparatus not shown is mounted on an accessary shoe 102 of clip-on type. An eye piece shutter closing lever 103 drives an eye piece shutter to shut out light to enter an eye piece 104. An eye-gaze detecting adapter mount rail 105a is arranged to couple with a mount rail 105b on eye-gaze detecting adapter 109, as described below. An eye-gaze detecting adapter setting lever 106 permits the eye-gaze detecting adapter to be detached when an unrepresented claw thereof keeping the eye-gaze detecting adapter fixed moves from a fixed position to a non-fixed position. Finder side contacts 107a for communication with the eye-gaze detecting adapter 109 are arranged to be connected with adapter side communication contacts 107b on eye-gaze detecting adapter 109 as described below to receive the eye-gaze direction. A pattern 108 on the finder portion 101 matches unevenness of skid stopper 111 on the eye-gaze detecting adapter 109 in order that the eye-gaze detecting adapter 109 and the camera body appear integral with each other when they are combined. FIG. 2B shows an example of specific construction of eye-gaze detecting adapter in the first embodiment. An eye-gaze detecting adapter body 109 is so arranged that it can be set on the finder portion 101 through a mount rail 105b on the eye-gaze detecting adapter side. The eye-gaze detecting adapter side communication contacts 107b are located at positions where they can be connected with the finder side contacts 107a when the adapter body 109 is mounted on the finder portion through the mount rails 105a, 105b. An eye piece glass 110 prevents dust or waterdrop from entering the inside of finder through the eye piece portion when the eye-gaze detecting adapter 109 is mounted on the finder portion. The skid stopper 111 permits an observer to readily hold the eye-gaze detecting adapter when he or she dismounts the eye-gaze detecting adapter from the finder portion.

In FIG. 2A and FIG. 2B, the five communication contacts 107 are provided on each of the finder portion 101 and the eye-gaze detecting adapter 109, which are for power for the CPU 2 and the observing portion, power for the illuminating portion, signal transmission from the finder, signal reception from the eye-gaze detecting adapter, and ground. The number of contacts may be increased or decreased with necessity. The CPU 1 on the camera body side transmits a signal to the eye-gaze detecting adapter and judges whether the eye-gaze detecting adapter is mounted or not when it receives a response signal. If no eye-gaze detecting adapter is mounted, the CPU 1 on the camera body side controls the camera by the camera control method for case with no eye-gaze information. A power source for eye-gaze detecting adapter could be provided on the adapter side, but the power is fully supplied from the camera body through the communication contacts 107a on the finder portion to the adapter in the first embodiment.

Figure 3:
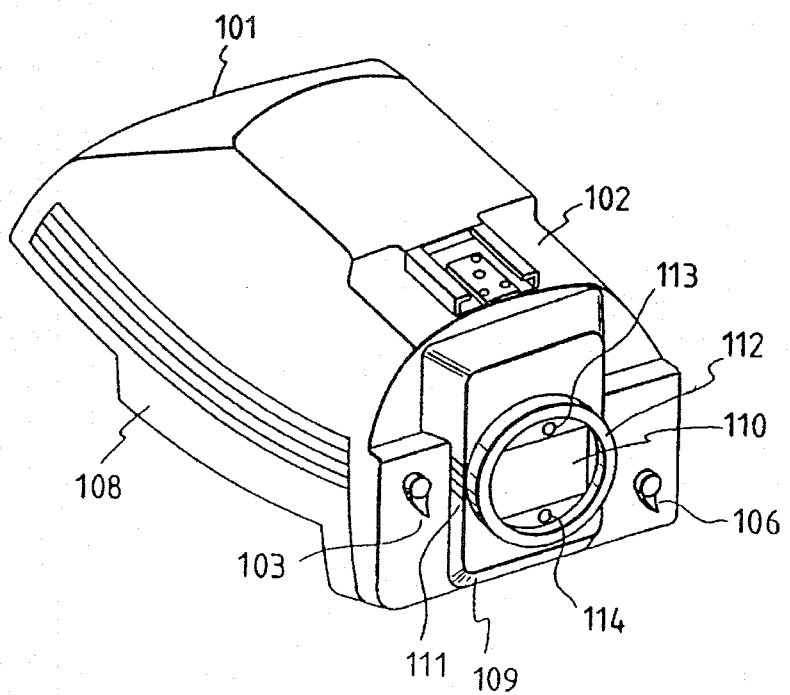
FIG. 3 is a drawing to show the eye-gaze detecting adapter set in the finder portion in the first embodiment.

FIG. 3 is a drawing to show a state in which the eye-gaze detecting adapter of FIG. 2B is mounted on the finder portion of FIG. 2A. FIG. 3 shows the other side of the eye-gaze detecting adapter shown in FIG. 2B. In FIG. 3, the same elements are denoted by the same reference numerals as those in FIG. 2A and FIG. 2B. An eye piece pad 112 is made of a rubber. A suitable illuminating portion 113 for eye-gaze detection is an infrared emitting diode (IRED), which emits light of wavelength in infrared zone invisible to observer's eyes. An imaging lens 114 forms an image on a photoelectric conversion element. A surface light-receiving element such as CCD is suitable for the photoelectric conversion element.

The illuminating portion 113 and the observing portion 114 can be mounted and positioned on a single chip in the eye-gaze detecting adapter in the first embodiment. The production process may be simplified by placing all the circuits and elements such as CPU on a single chip.

Figure 4:
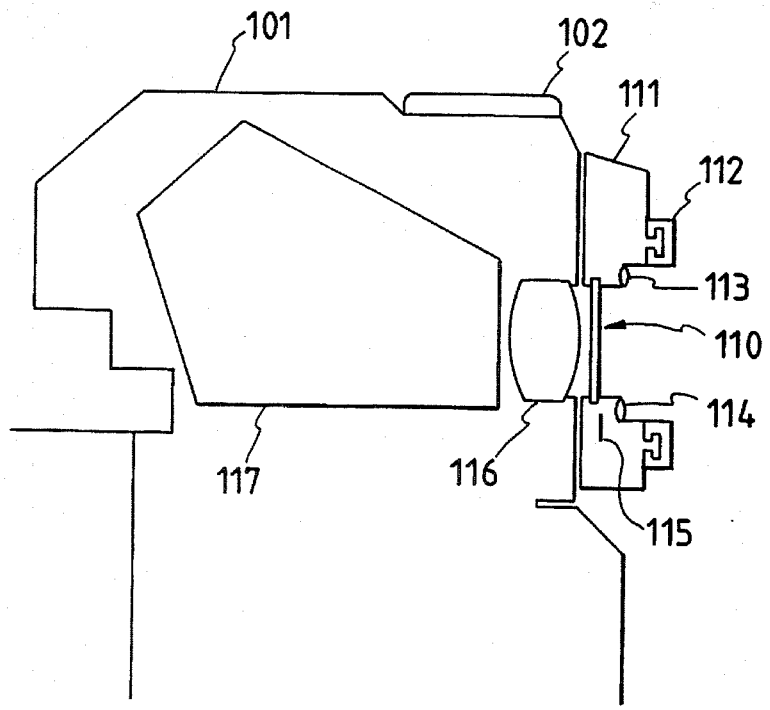
FIG. 4 is a schematic drawing to show optical systems in the finder portion and in the eye-gaze detecting adapter in the embodiment.

FIG. 4 is a schematic drawing to show optical systems in the finder portion 101 and in the eye-gaze detecting adapter 109. The imaging lens 114 constitutes a tilt optical system. A surface light-receiving element such as CCD is suitable for the photoelectric conversion element 115. The illuminating portion 113, the imaging lens 114 and the photoelectric conversion element 115 constitute an eye-gaze detecting apparatus, and all circuits driving these elements are enclosed in the eye-gaze detecting adapter 109. Although the eye piece 116 is illustrated as a single lens, it can be a compound lens comprised of a plurality of lenses in actual applications. Since the optical system and the camera body construction existing on the subject side below a pentaprism 117 are not directly relevant to the present invention, they are omitted to show. As shown, the optical system up to the eye piece 116 is located on the camera body side and the eye piece glass 110 is in the eye piece detecting adapter 109 in the present invention. An eye piece (116) having a diopter correcting mechanism is known. The eye piece 116 may be arranged to have the diopter adjusting mechanism, though not shown in FIG. 4.

Figure 5:
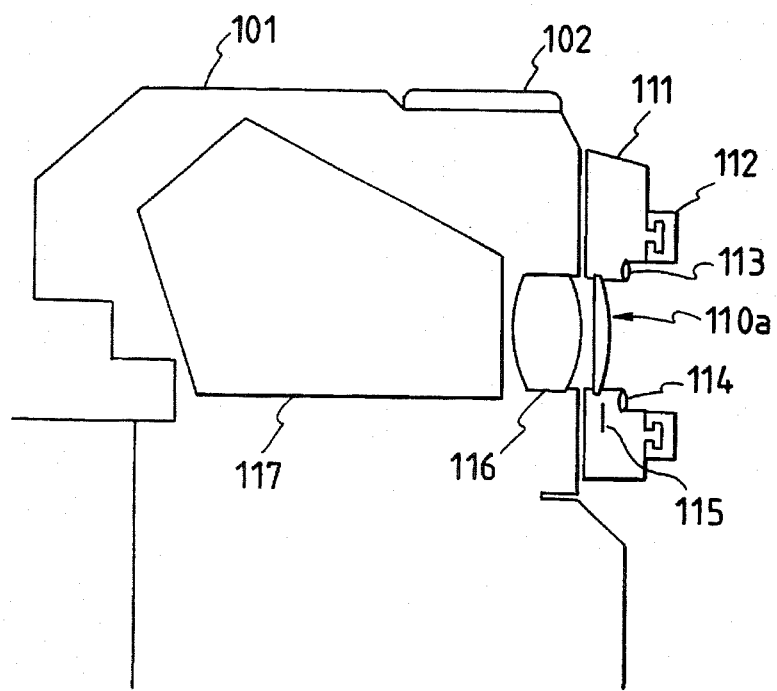
FIG. 5 is a schematic drawing to show optical systems in an eye-gaze detecting adapter of the present invention having a diopter adjusting lens and in a finder portion.

Although the eye piece glass 110 is described as plane glass having no power, which prevents dust or waterdrop from entering the inside of finder, the eyeglass can be constructed as interchangeable with one having a power for also serving as power adjusting lens. In the present invention, the eye-gaze direction can be calculated more accurately, if eye-gaze detecting adapters are prepared as diopter-corrected according to degrees of observer's visual acuity, if a whole eye-gaze detecting adapter is interchanged with another, and if necessary information for each adapter regarding nearsightedness or farsightedness (for example, index of diffraction of crystalline lens) is preliminarily stored in ROM in each eye-gaze detecting adapter. In FIG. 5, 110a represents a diopter adjusting lens. Also in this case, only the information of calculated eye-gaze direction is transmitted to the camera body upon communication, so that no change is necessary in camera body.

Figure 6:
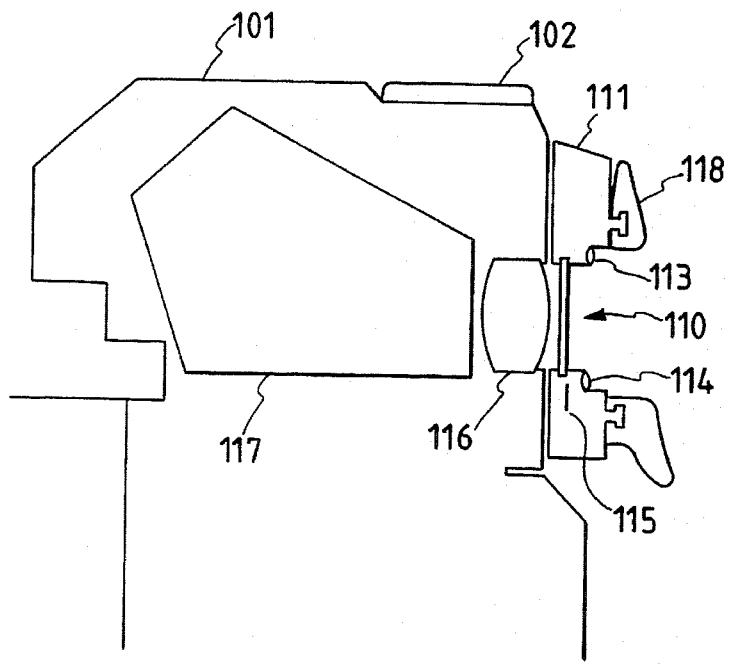
FIG. 6 is a schematic drawing to show optical systems in an eye-gaze detecting adapter of the present invention having an eyeglass pad and in a finder portion.

Further, FIG. 6 shows an eye-gaze detecting adapter having an eye piece pad 118 for eyeglasses in a shape to incline an eyeglass lens contacting therewith with respect to the optical axis of finder optical system, in place of the eye piece pad 112. Although the eye piece glass having no power is used in FIG. 6, the adapter may be arranged to have an optical system for extending the eye point for eyeglasses. If ROM has information (such as imaging magnification and presence or absence of eyeglasses) in such arrangement, erroneous detection of eye-gaze direction can be prevented even with change in imaging magnification due to the movement of eye point. The method for detecting presence or absence of eyeglasses is known for example in Japanese Laid-open Patent Application No. 3-109028. An eyeglass detecting portion may be set in the eye piece pad 118 for eyeglasses or in the main body of eye-gaze detecting adapter 109 to detect the presence or absence of eyeglasses, whereby the eye-gaze direction may be detected in either condition. In this case, the information about presence or absence of eyeglasses is used only for calculating the eye-gaze direction in CPU in the eye-gaze detecting adapter and therefore there is no need to increase the number of contacts for communication with camera body.

Although the illumination portion 113, the imaging optical system 114 and the observing portion 115 are so arranged in FIG. 3 to FIG. 6 that an illuminating portion 113 is provided above the finder eye piece window and that a pair of imaging optical system 114 and photoelectric conversion element 115 are provided below the eye piece window, positions and numbers of the elements may be determined as most suitable for each eye-gaze detecting portion employed. There are no specific restrictions on the numbers and positions in any area of eye-Gaze detecting adapter 109 as far as the positions and the numbers are appropriate to obtain the eye-gaze direction by each eye-gaze detecting method employed. The iris has a color, different depending upon the race, for example, blue, blown, black, etc. Preparing an eye-gaze detecting adapter adjustable in an illumination light quantity of illuminating portion depending upon the color of iris, suitable illumination light can be emitted by adjusting a quantity of emitted light from the illuminating portion.

Furthermore, there are people using the right eye and people using the left eye for looking into the finder of camera. The deviation of visual axis from the optical axis of eyeball for right eye is inconveniently opposite to that for left eye. The inconvenience can be overcome by using eye-gaze detecting adapters for right eye and for left eye or by preparing a ROM storing the deviation amounts of visual axis from the optical axis of eye optical system. Similarly, an eye-gaze detecting adapter may be prepared for people with strabismus.

As described above, the variations are possible for eye-gaze detecting adapter, taking into consideration the eye-gaze detecting methods, the presence or absence of eyeglasses and the individual differences. However, since each eye-gaze detecting adapter of the present invention includes a ROM having necessary information, the adapter can accurately calculate the eye-gaze direction and transmit the calculated eye-gaze direction to the camera body through the communication contacts.

Figure 7:
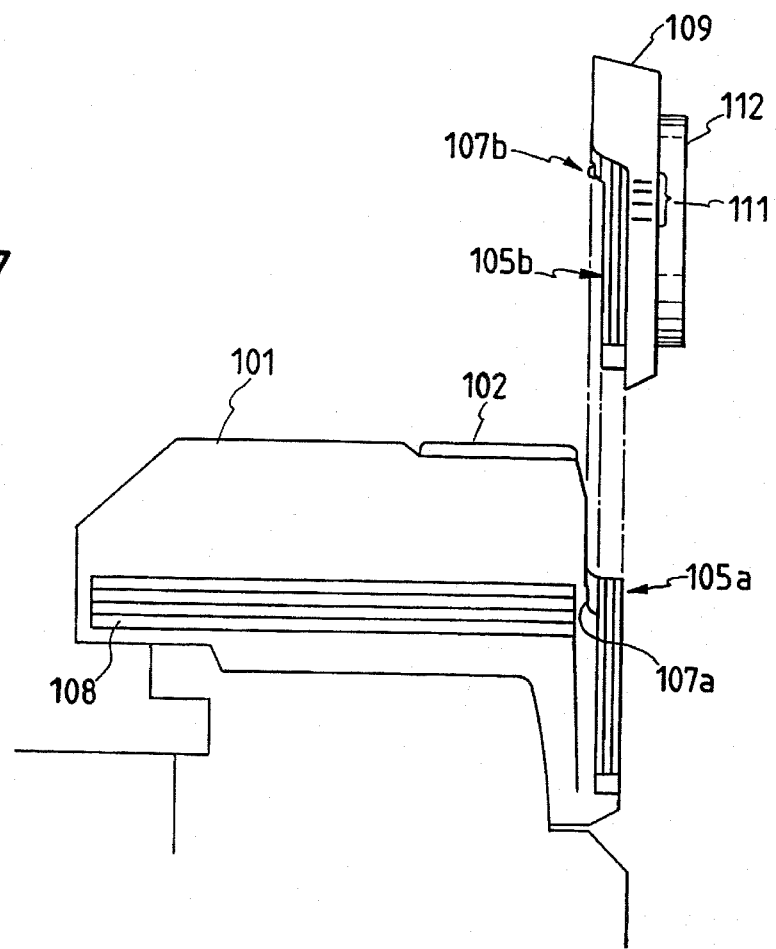
FIG. 7 is a drawing to show how to set an eyeglass detecting adapter onto a finder portion of camera body in an embodiment.

FIG. 7 is a drawing to show how to set the eye-gaze detecting adapter 109 onto the finder portion 101. The eye-gaze detecting adapter 109 is drawn down from above the camera body to couple the mount rail 105a on the finder portion 101 with the mount rail 105b on the eye-gaze detecting adapter 109 while positioning the adapter. Then, the adapter is slid down and finally fixed by an unrepresented claw on the mount rail. The communication contacts 107a, 107b are located as to contact with each other when the adapter is set on the finder.

Figure 8A:
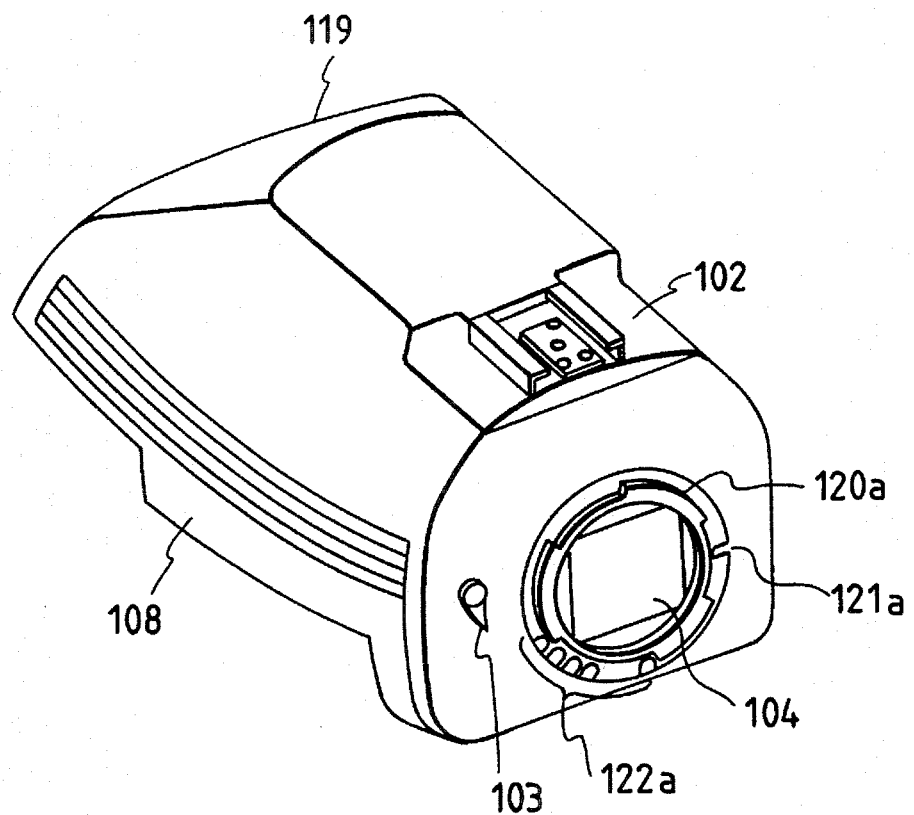
FIGS. 8A and 8B are drawings to show a finder portion of camera body having another mount shape and an eye-gaze detecting adapter in an embodiment.
Figure 8B:
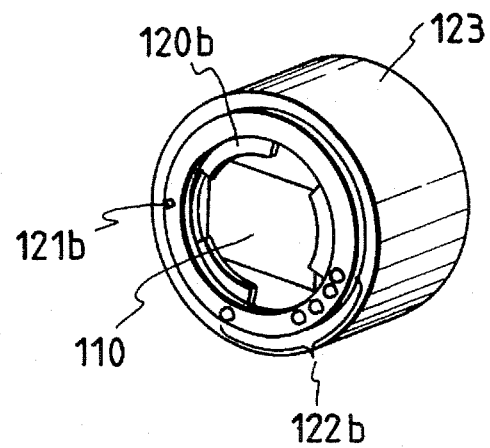

The method for mounting the eye-gaze detecting adapter onto the camera body is not limited to the slide type as described in the first embodiment. FIG. 8A and FIG. 8B show the second method for mounting the eye-gaze detecting adapter onto the finder portion in the second embodiment.

In FIG. 8A the same elements are denoted by the same reference numerals as those in the first embodiment. A mount portion 120a has the same structure as the bayonet-type mount which is employed in photographic lenses for camera. A slot 121a is provided for receiving a pin for keeping the eye-gaze detecting adapter locked. Finder side contacts 122a are for communicating with the eye-gaze detecting adapter, which are arranged along the circumference on bayonet-type mount. In FIG. 8B, the eye-gaze detecting adapter body 123 is arranged to be set on a finder portion 119 using a bayonet-type mount 120b and a locking pin 121b. Eye-gaze detecting adapter side communication contacts 122b are located at positions where they are connected with finder side contacts 122a when the adapter is set on the finder portion through the bayonet-type mounts 120a, 120b.

Figure 9:
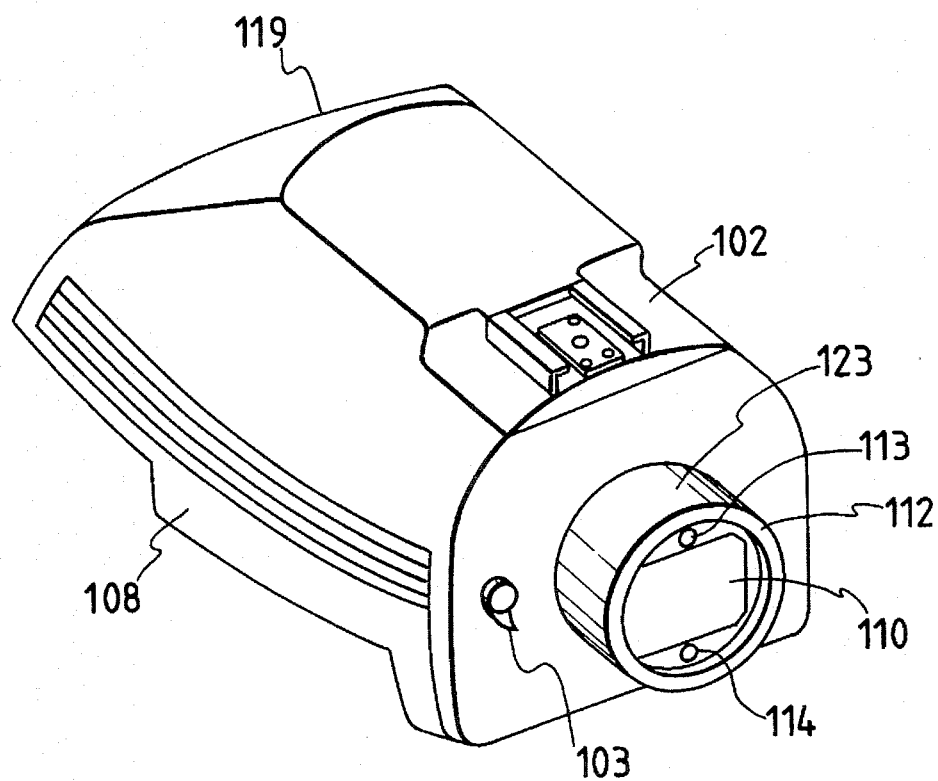
FIG. 9 is a drawing to show the eye-gaze detecting adapter set on the finder portion having the mount portion of another shape.

FIG. 9 is a drawing to show a state in which the eye-gaze detecting adapter of FIG. 8B is set on the finder portion of FIG. 8A. FIG. 9 shows the back side of the eye-gaze detecting adapter shown in FIG. 8B. In FIG. 9, the same elements are denoted by the same reference numerals as those in FIG. 8A and FIG. 8B.

Figure 10:
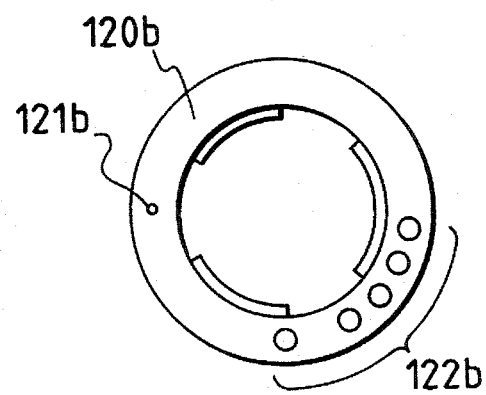
FIG. 10 is a drawing to show an arrangement of communication contacts on a bayonet-type mount of eye-gaze detecting adapter.

FIG. 10 is an enlarged view of the bayonet-type mount portion of the eye-gaze detecting adapter shown in FIG. 8B. The contacts 122b for communication with the finder are arranged along the circumference on the bayonet-type mount. Here, the arrangement of communication contacts is not limited to that shown in FIG. 10, but any arrangement may be employed as far as the communication contacts on the camera body side come to contact with those on the eye-gaze detecting adapter when the eye-gaze detecting adapter is mounted on the finder portion of camera body.

Figure 11A:
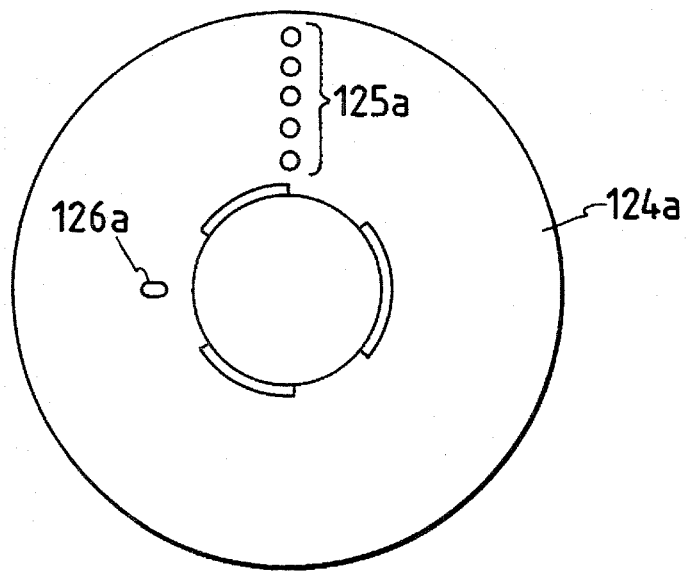
FIGS. 11A and 11B are drawings to show an arrangement of communication contacts on a bayonet-type mount of finder portion of camera body.
Figure 11B:
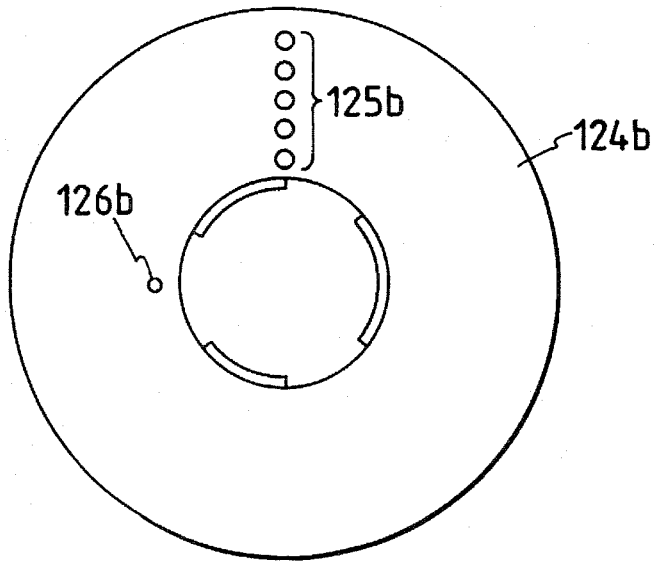

FIG. 11A and FIG. 11B show another example of arrangement of communication contacts. FIG. 11A shows contacts on a finder portion and FIG. 11B does contacts on an eye-gaze detecting adapter. As compared with the arrangement in FIG. 10, the contacts in this example are aligned in the radial direction on the surface of bayonet-type mount. FIG. 11A shows the finder side and FIG. 11B the eye-gaze detecting adapter side. In FIG. 11A and FIG. 11B, 124a, 124b denote bayonet-type mounts; 125a, 125b communication contacts; 126a a locking pin receiving hole; and 126b a locking pin.

Figure 12:
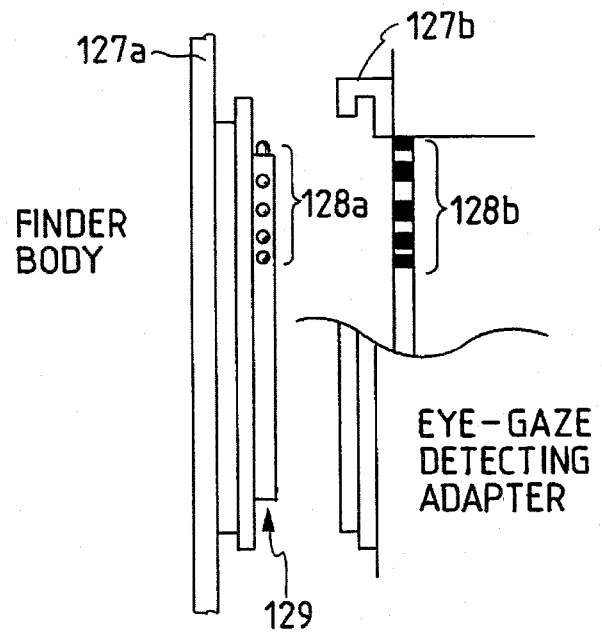
FIG. 12 is a drawing to show another arrangement of communication contacts on a bayonet-type mount.

FIG. 12 also shows another example of arrangement of communication contacts between the finder portion and the eye-gaze detecting adapter. As compared to the arrangement in FIG. 10, communication contacts 128a are arranged in the circumferential direction on a projection 129 from the bayonet surface so as to contact with contacts 128b on the adapter side.

Figure 13:
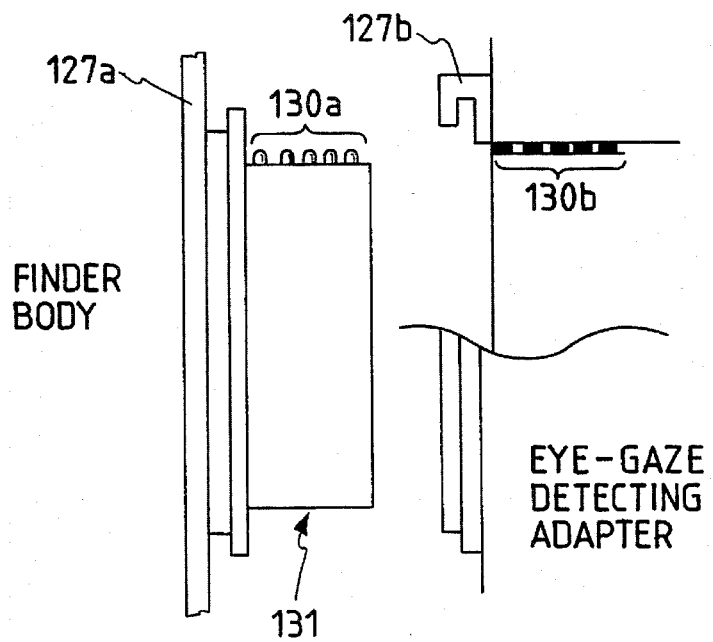
FIG. 13 is a drawing to show another arrangement of communication contacts on a bayonet-type mount.

FIG. 13 shows another example of arrangement of communication contacts between the finder portion and the eye-gaze detecting adapter. As compared with the arrangement in FIG. 10, the communication contacts are arranged in the direction of optical axis of eye piece optical system on a projection 131 from the bayonet surface. In FIG. 13, 130a, 130b are communication contacts.

Figure 14:
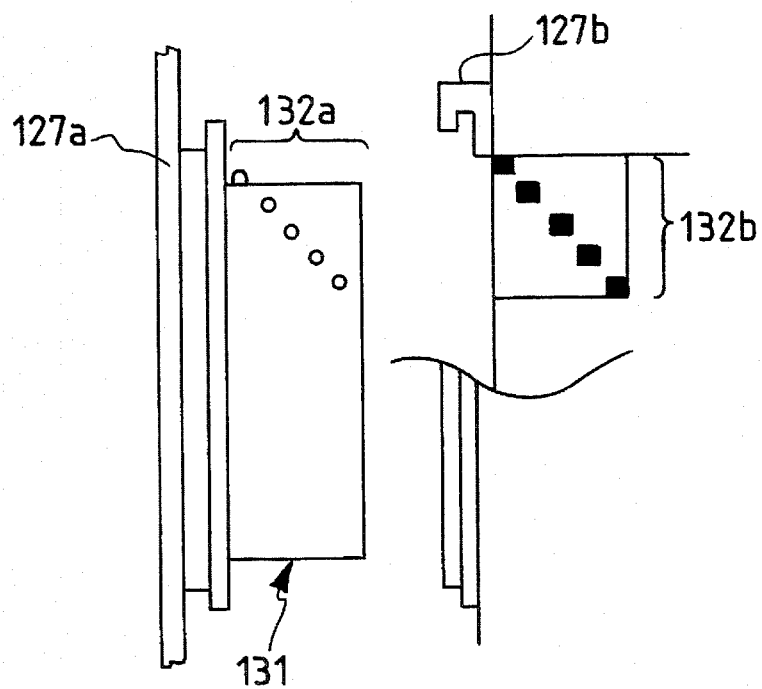
FIG. 14 is a drawing to show another arrangement of communication contacts on a bayonet-type mount.
Figure 15:
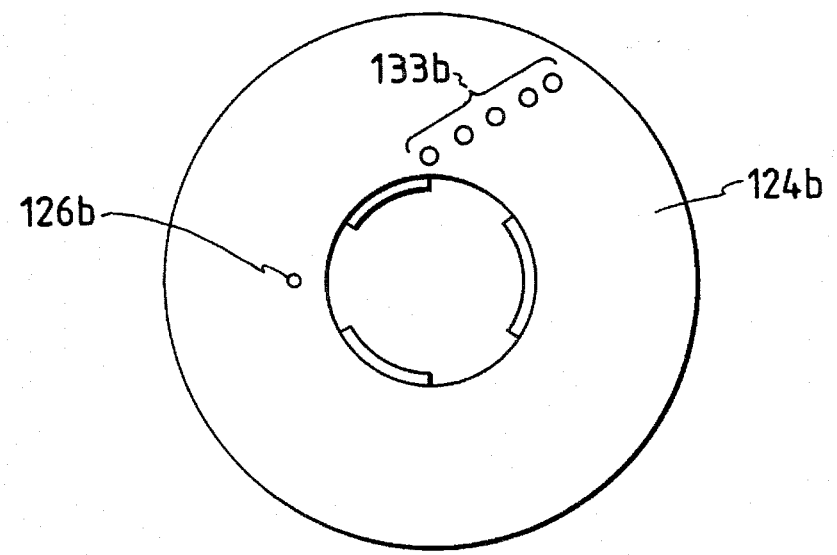
FIG. 15 is a drawing to show another arrangement of communication contacts on a bayonet-type mount of eye-gaze detecting adapter.

The communication contacts may be arranged to spread both in the circumferential direction and in the direction of optical axis, as shown in FIG. 14, or both in the circumferential direction and in the radial direction, as shown in FIG. 15. In the drawings, 132a, 132b and 133b are communication contacts.

Figure 16A:
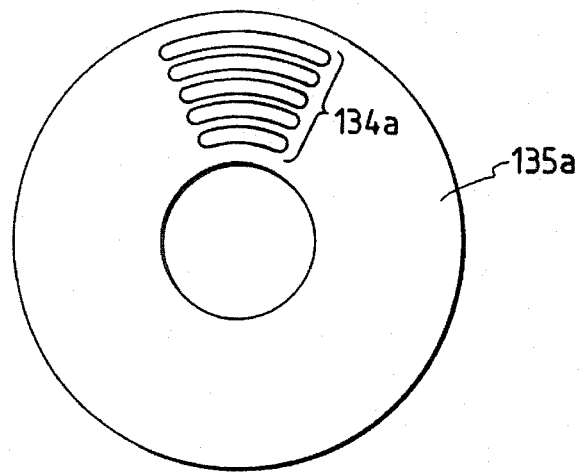
FIGS. 16A and 16B are drawings to show an arrangement of communication contacts on a screwed-type mount of finder portion in camera body.
Figure 16B:
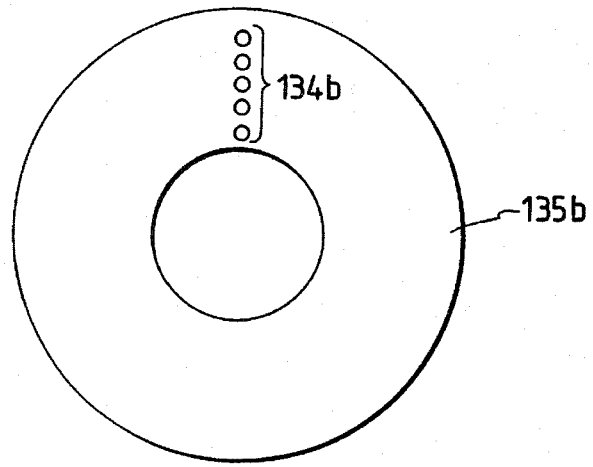

FIG. 16A and FIG. 16B illustrate an example of the configuration of communication contacts, in which a screwed type mount is used in place of the bayonet-type mount. Numerals 135a and 135b designate screwed type mounts, and 134a, 135b communication contacts. The location of communication contacts will be deviated more or less depending upon the accuracy of working, and therefore, the finder side contacts 134a are shaped to spread in the direction of deviation thereof. In the screwed type mount arrangement, the configuration of contacts may be modified as shown in FIG. 12 to FIG. 15. Contacts on one mount should be shaped to spread in the direction of deviation thereof, as shown in FIG. 16A, in such modifications.

Another method, for example a method using clicks may be employed for mounting the eye-gaze detecting adapter onto the finder portion. The communication contacts on the camera body side should be positioned to contact with those on the eye-gaze detecting adapter in the method.

Figure 17:
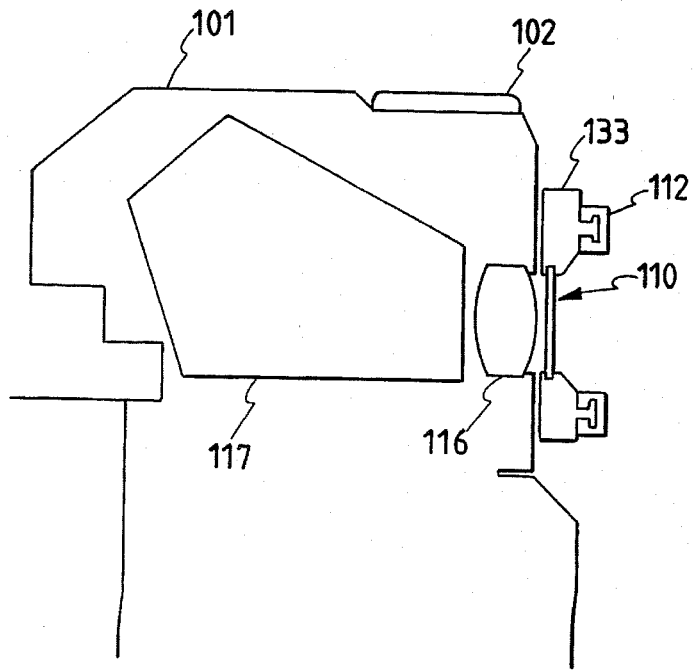
FIG. 17 is a schematic drawing to show optical systems in an eye piece adapter having no eye-gaze detecting portion and in a finder portion.

The eye-gaze detecting adapter was described above in the first embodiment. Among various phototaking circumstances, there could be phototaking circumstances in which the eye-gaze detecting portion is unnecessary. An eye piece adapter having no eye-gaze detecting portion can be set for photography in that case. FIG. 17 shows an example of eye piece adapter having no eye-gaze detecting portion. The eye piece adapter has an eye piece glass 110. As compared with FIG. 4, the eye piece adapter excludes an illuminating portion (113), an observing portion (114, 115), communication contacts and a drive circuit (not shown), a CPU, a memory, or a ROM, whereby the adapter is simpler in structure, lighter in weight and smaller in size, which reduces the load on photographer.

Figure 18:
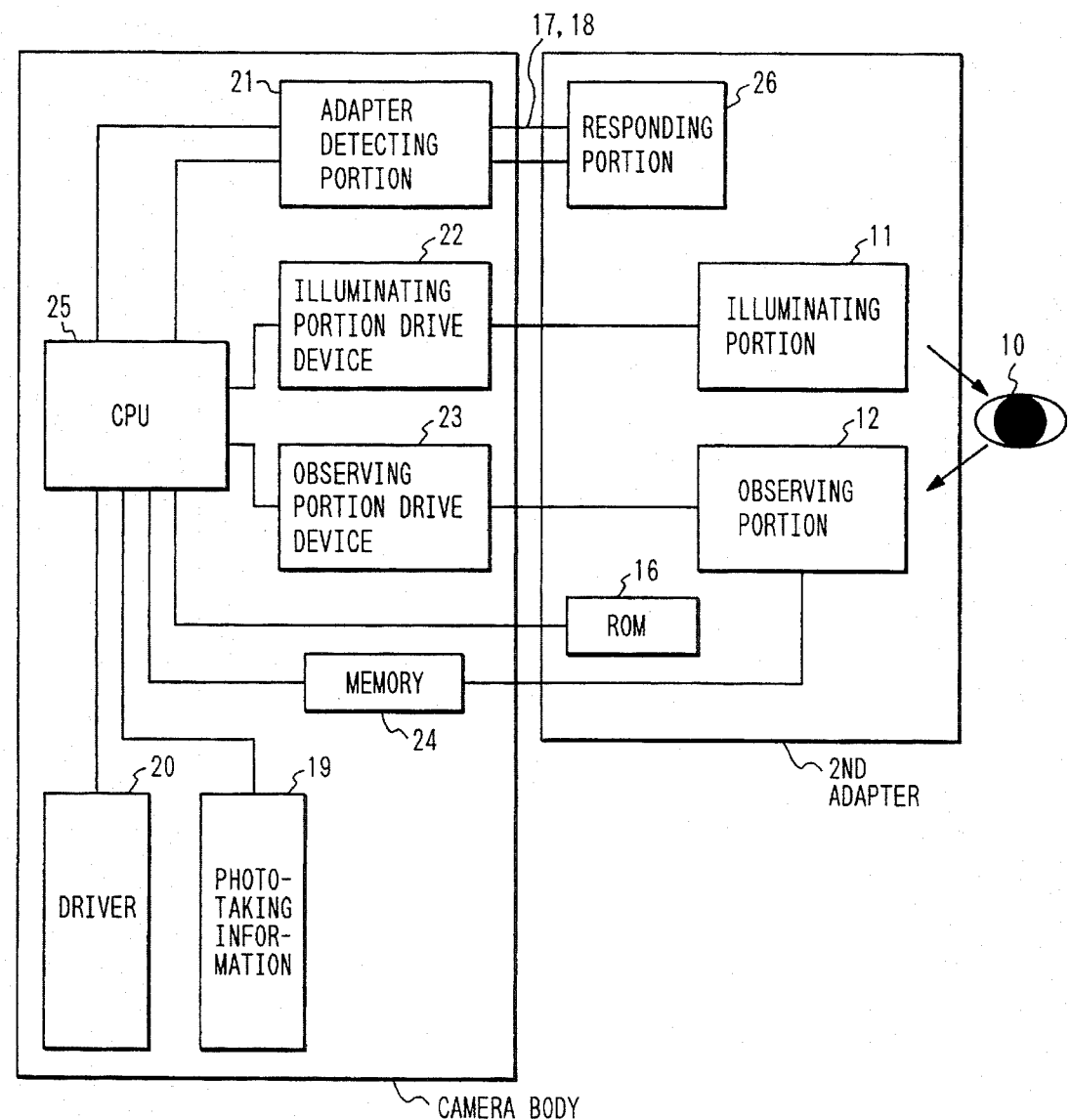
FIG. 18 is a block diagram to show function assignments for second eye-gaze detecting adapter and for camera body in the second embodiment.

The second embodiment will be described in the following. FIG. 18 is a block diagram to show function assignments for second eye-gaze detecting adapter and for camera body. In FIG. 18, the second eye-gaze detecting adapter has an illuminating portion 11 for illuminating an eyeball 10 of observer, an observing portion 12 for observing the eyeball 10 of observer illuminated by the illuminating portion, a ROM 16 having information necessary for eye-gaze detection, and a responding portion 26 for responding to a call sign for detecting whether the second eye-gaze detecting adapter is mounted on the camera body. Further, a communication portion 17 is provided for transmitting information to a CPU 25 in camera body through contacts provided on the finder portion of camera body.

The camera body has a communication portion 18 for receiving information of eye-gaze direction from the eye-gaze detecting adapter, an adapter detecting portion 21 for detecting whether the second eye-gaze detecting adapter is mounted, an illuminating portion drive device 22 for driving the illuminating portion on the second eye-gaze detecting adapter, an observing portion drive device 23 for driving the observing portion on the second eye-gaze detecting adapter, a memory 24 which is a storage portion for storing information output from the observing portion, and a CPU 25 for calculating the eye-gaze direction with the information in memory and the information in ROM transmitted from the second eye-gaze detecting adapter. The CPU 25 processes the thus calculated eye-gaze information and the phototaking information obtained from camera body and phototaking lens to control a driver 20 for driving various functions in camera.

The eye-gaze detecting adapter in the second embodiment includes only the illuminating portion 11, the observing portion 12, the ROM 16 and the responding portion 26, so that the adapter may be made cheaper than that in the first embodiment. The CPU in camera body can be divided into a CPU for processing the information from camera body and phototaking lens and for controlling the camera body and the phototaking lens, and another CPU for calculating the eye-gaze direction. The power is fully supplied to the second eye-gaze detecting adapter from the camera body through the communication contacts. Since there are various methods proposed for detecting the eye-gaze direction, the description thereof is omitted herein.

Figure 19:
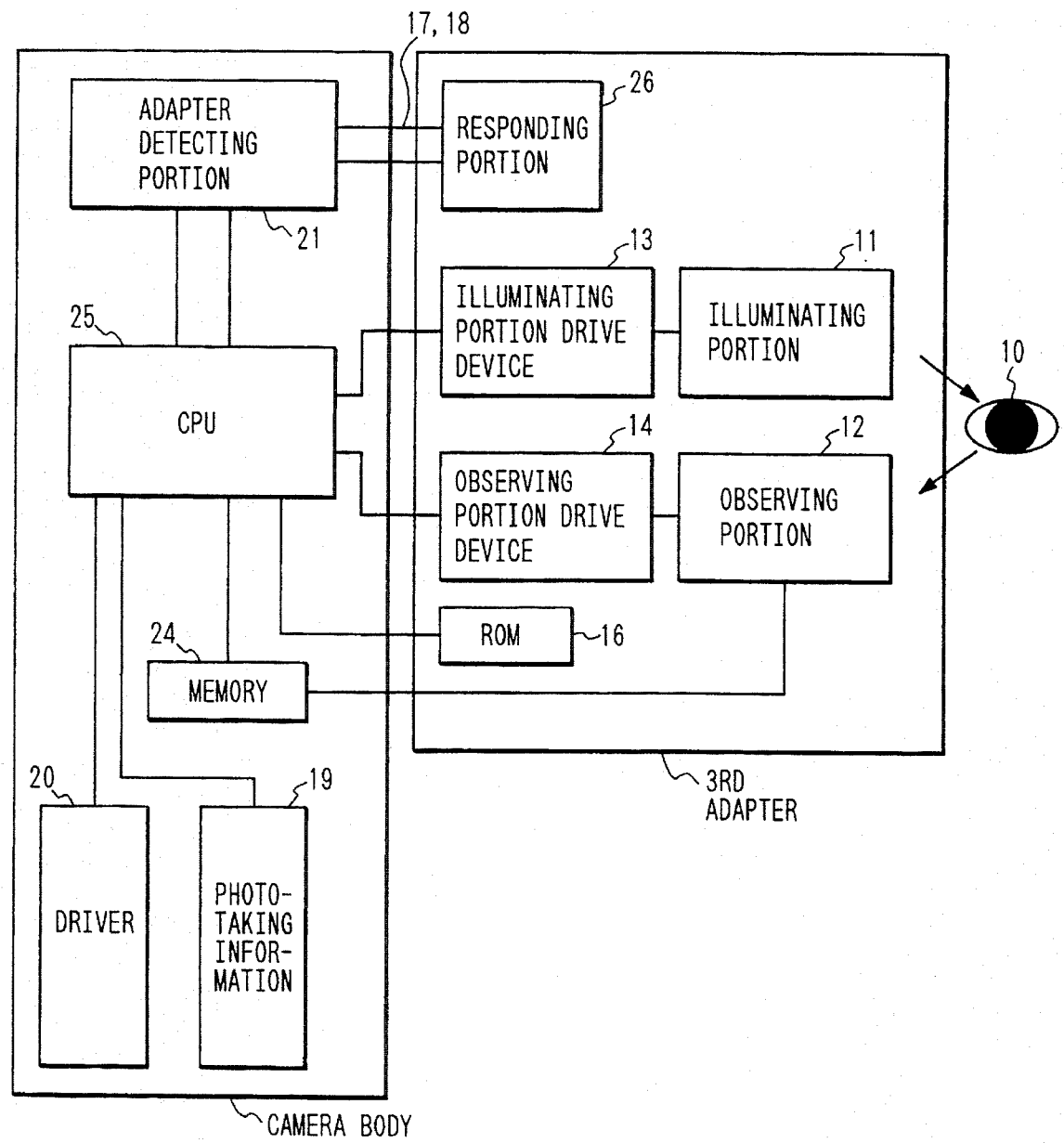
FIG. 19 is a block diagram to show function assignments for third eye-gaze detecting adapter and for camera body in the third embodiment.

The third embodiment will be described in the following. FIG. 19 is a block diagram to show function assignments for third eye-gaze detecting adapter and for camera body. In FIG. 19, the third eye-gaze detecting adapter has an illuminating portion 11 for illuminating an eyeball 10 of observer, an observing portion 12 for observing the eyeball 10 of observer illuminated by the illuminating portion 11, an illuminating portion drive device 13 for driving the illuminating portion on the third eye-gaze detecting adapter, an observing portion drive device 14 for driving the observing portion on the third eye-gaze detecting adapter, a ROM 16 having information necessary for eye-gaze detection, a responding portion 26 for responding to a call signal for detecting whether the third eye-gaze detecting adapter is mounted on the camera body, and a communicating portion 17 for transmitting information to a CPU 25 in camera body through contacts provided on a finder portion of camera body.

The camera body has a communicating portion 18 for receiving the information of eye-gaze direction from the eye-gaze detecting adapter, an adapter detecting portion 21 for detecting whether the third eye-gaze detecting adapter is mounted, a memory 24 which is a storage portion for storing information output from the observing portion 12, and a CPU 25 for calculating the eye-gaze direction using the information in memory and the information in ROM transmitted from the third eye-gaze detecting adapter. The CPU processes the thus calculated eye-gaze information and the phototaking information obtained from camera body and phototaking lens to control a driver 20 for driving various functions in camera.

The CPU 25 in camera body can be divided into a CPU for processing information from camera body and phototaking lens and for controlling the camera body and the phototaking lens, and another CPU calculating the eye-gaze direction.

Also to the third eye-gaze detecting adapter, the power is fully supplied from the camera body through the communication contacts.

As described above in detail, according to the present invention, only the eye-gaze detecting apparatus can be made interchangeable, which is advantageous in that the individual differences among observers looking into camera can be sufficiently dealt with.

Although the present invention was described with the embodiments of camera, the invention is also applicable to imaging apparatus other than cameras, such as video cameras and binoculars.

What is claimed is:

1. An eye-gaze detecting adapter comprising:
    an illuminating portion for illuminating an eyeball of an observer;
    an illumination drive portion for driving said illuminating portion;
    an observing portion for observing an eyeball of an observer illuminated by said illuminating portion and outputting eye-gaze direction information;
    an observation drive portion for driving said observing portion;
    a first storage portion for storing information output from said observing portion;
    a second storage portion having information necessary for eye-gaze detection;
    a calculating portion for calculating an eye-gaze direction of an observer, based on information stored in said first storage portion and the information from said second storage portion;
    a control portion for controlling said illumination drive portion and said observation drive portion;
    a mounting portion for mounting the adapter onto an imaging apparatus body; and
    a communication portion for transmitting information of eye-gaze direction obtained by said calculating portion to said imaging apparatus body.

2. An eye-gaze detecting adapter according to claim 1, further comprising a diopter correcting portion for correcting eyesight of an observer, which is disposed between the eyeball of an observer and said observing portion.

3. An eye-gaze detecting adapter according to claim 1, further comprising:
    a detecting portion for detecting whether an observer is wearing eyeglasses; and
    a correcting portion for correcting the information of eye-gaze direction obtained by said calculating portion if said detecting portion detects that an observer is wearing eyeglasses.

4. An imaging device comprising:
    a mount portion onto which an eye-gaze detecting adapter for detecting an eye-gaze direction of an observer is to be mounted;
    a communication portion for receiving information of eye-gaze direction from said eye-gaze detecting adapter;
    a control portion for controlling various functions of an imaging apparatus body, based on the information of eye-gaze direction received by said communication portion; and
    an imaging apparatus drive portion for driving the various functions of said imaging apparatus body by said control portion.

5. An imaging apparatus system comprising:
    an eye-gaze detecting adapter having:
    an illuminating portion for illuminating an eyeball of an observer;
    an illumination drive portion for driving said illuminating portion;
    an observing portion for observing an eyeball of an observer illuminated by said illuminating portion and outputting eye-gaze direction information;
    an observation drive portion for driving said observing portion;
    a first storage portion for storing information output from said observing portion;
    a second storage portion having information necessary for eye-gaze detection;
    a calculating portion for calculating an eye-gaze direction of an observer, based on the information stored in said first storage portion and the information from said second storage portion;
    a first control portion for controlling said illumination drive portion and said observation drive portion;
    a mounting portion for mounting the adapter onto an imaging apparatus body; and
    a first communication portion for transmitting information of eye-gaze direction obtained by said calculating portion to said imaging apparatus body; and
    an imaging apparatus body having:
    a mount portion onto which said eye-gaze detecting adapter is detachably mountable through said mounting portion;
    a second communication portion which is to be connected with said first communication portion to receive said information of eye-gaze direction;
    a second control portion for controlling various functions of said imaging apparatus body, based on the information of eye-gaze direction received by said second communication portion; and
    an imaging apparatus drive portion for driving the various functions of said imaging apparatus body by said second control portion.

6. An imaging apparatus system according to claim 5, wherein a power supplying portion is provided for supplying power from said imaging apparatus body to said eye-gaze detecting adapter.

7. An eye-gaze detecting adapter comprising:
    an illuminating portion for illuminating an eyeball of an observer;
    an observing portion for observing said eyeball of said observer illuminated by said illuminating portion and outputting eye-gaze direction information;
    a storage portion having information necessary for eye-gaze detection;
    a mounting portion for mounting the adapter onto an imaging apparatus body; and a communication portion for transmitting information from said observing portion and the information from said storage portion to said imaging apparatus body.

8. An eye-gaze detecting adapter according to claim 7, further comprising:

a diopter correcting portion for correcting eyesight of an observer which is disposed between an eyeball of an observer and said observing portion.

9. An imaging apparatus comprising:

a mount portion onto which an eye-gaze detecting adapter outputting information for detecting an eye-gaze direction of an observer is to be mounted;

an illumination drive portion for driving an illuminating portion illuminating an eyeball of an observer and provided in said eye-gaze detecting adapter;

an observation drive portion for driving an observing portion observing said eyeball of an observer, said observing portion being provided in said eye-gaze detecting adapter and outputting eye-gaze direction information;

a communication portion for receiving from said eye-gaze detecting adapter information from said observing portion and information necessary for eye-gaze detection;

a calculating portion for calculating an eye-gaze direction of an observer, based on the information from said observing portion and the information necessary for eye-gaze detection transmitted from said communication portion;

a control portion for controlling various functions of an imaging apparatus body, said illumination drive portion and said observation drive portion, using the eye-gaze direction calculated by said calculating portion; and an imaging apparatus drive portion for driving the various functions of said imaging apparatus body by said control portion.

10. An imaging apparatus system comprising:

an eye-gaze detecting adapter having:

an illuminating portion for illuminating an eyeball of an observer;

an observing portion for observing an eyeball of an observer illuminated by said illuminating portion and outputting eye-gaze direction information;

a storage portion having information necessary for eye-gaze detection;

a mounting portion for mounting the adapter onto an imaging apparatus body; and a first communication portion for transmitting information from said observing portion and the information from said storage portion to said imaging apparatus body; and an imaging apparatus body having:

a mount portion onto which said eye-gaze detecting adapter is to be mounted through said mounting portion;

a second communication portion which is to be connected with said first communication portion to receive the information from said observing portion the information from said storage portion;

an illumination drive portion for driving said illuminating portion;

an observation drive portion for driving said observing portion;

a calculating portion for calculating an eye-gaze direction of an observer, based on the information from said observing portion and the information from said storage portion transmitted from said second communication portion;

a control portion for controlling various functions of said imaging apparatus body, said illumination drive portion and said observation drive portion, using the eye-gaze direction calculated by said calculating portion; and a drive portion for driving the various functions of said imaging apparatus body by said control portion.

11. An imaging apparatus system according to claim 10, wherein a power supplying portion is provided for supplying power from said imaging apparatus body to said eye-gaze detecting adapter.

12. An imaging apparatus system according to claim 10, wherein said imaging apparatus body has a detecting portion for detecting whether said eye-gaze detecting apparatus is mounted thereon and wherein said eye-gaze detecting adapter has a responding portion for responding to detection of said detecting portion.

13. An imaging apparatus system according to claim 10, wherein said imaging apparatus body has a buffer portion for temporarily storing the information from said observing portion.

14. An eye-gaze detecting adapter comprising:

an illuminating portion for illuminating an eyeball of an observer;

an illumination drive portion for driving said illuminating portion;

an observing portion for observing an eyeball of an observer illuminated by said illuminating portion and outputting eye-gaze direction information;

an observation drive portion for driving said observing portion;

a storage portion having information necessary for eye-gaze detection;

a mounting portion for mounting the adapter onto an imaging apparatus body; and a communication portion for transmitting information from said observing portion and information from said storage portion to said imaging apparatus body.

15. An eye-gaze detecting adapter according to claim 14, further comprising:

a diopter correcting portion for correcting eyesight of an observer which is disposed between an eyeball of an observer and said observing portion.

16. An imaging apparatus comprising:

a mount portion onto which an eye-gaze detecting adapter outputting information for detecting an eye-gaze direction of an observer is to be mounted;

a communication portion for receiving from said eye-gaze detecting adapter information from an observing portion for observing an eyeball of an observer and outputting eye-gaze direction information, and for receiving information necessary for eye-gaze detection;

a calculating portion for calculating an eye-gaze direction of an observer, based on the eye-gaze direction information and the information necessary for eye-gaze detection received by said communication portion;

a control portion for controlling various functions of an imaging apparatus body, an illumination drive portion for driving an illuminating portion illuminating the eyeball of an observer, and an observation drive portion for driving said observing portion, using the eye-gaze direction calculated by said calculating portion; and an imaging apparatus drive portion for driving the various functions of said imaging apparatus body by said control portion.

17. An imaging apparatus system comprising:

an eye-gaze detecting adapter having:

an illuminating portion for illuminating an eyeball of an observer;

an illumination drive portion for driving said illuminating portion;

an observing portion for observing an eyeball of an observer illuminated by said illuminating portion and outputting eye-gaze direction information;

an observation drive portion for driving said observing portion;

a storage portion having information necessary for eye-gaze detection;

a mounting portion for mounting the adapter onto an imaging apparatus body; and a first communication portion for transmitting information from said observing portion and information from said storage portion to said imaging apparatus body; and an imaging apparatus body having:

a mount portion onto which said eye-gaze detecting adapter is to be mounted through said mounting portion;

a second communication portion which is to be connected with said first communication portion to receive the information from said observing portion and the information from said storage portion;

a calculating portion for calculating an eye-gaze direction of an observer, based on the information from said observing portion and the information from said storage portion received by said second communication portion;

a control portion for controlling various functions of said imaging apparatus body, said illumination drive portion and said observation drive portion, using the eye-gaze direction calculated by said calculating portion; and an imaging apparatus drive portion for driving the various functions of said imaging apparatus body by said control portion.

18. An imaging apparatus system according to claim 17, wherein a power supplying portion is provided for supplying power from said imaging apparatus body to said eye-gaze detecting adapter.

19. An imaging apparatus system according to claim 17, wherein said imaging apparatus body has a detecting portion for detecting whether said eye-gaze detecting adapter is mounted thereon and wherein said eye-gaze detecting adapter has a responding portion for responding to detection of said detecting portion.

20. An imaging apparatus system according to claim 17, wherein said imaging apparatus body has a buffer portion for temporarily storing the information from said observing portion.

21. An eye-gaze detecting adapter comprising:

an illuminating portion for illuminating an eyeball of an observer;

an observing portion for observing an eyeball of an observer illuminated by said illuminating portion and outputting eye-gaze direction information; and a mounting portion for mounting the adapter onto an imaging apparatus body.

22. An eye gaze detecting adapter comprising:

an illuminating portion which illuminates an eyeball of an observer;

an observing portion which observes an eyeball of an observer illuminated by said illuminating portion; and a mounting portion for mounting the adapter onto an optical apparatus body.

23. An optical apparatus comprising:

an illuminating portion which illuminates an eyeball of an observer;

an observing portion which observes an eyeball of an observer illuminated by the illuminating portion;

an attaching portion for attaching an eye-gaze detecting adapter onto an optical apparatus body by cooperation of the attaching portion with a mounting portion of the eye-gaze detecting adapter; and a control portion which controls various functions by eye-gaze information calculated based on a signal from said observing portion.

* * * * *